May 31, 1927.  
A. B. FOWLER  
1,630,565  
HEEL MACHINE  
Filed April 6, 1923 15 Sheets-Sheet 1

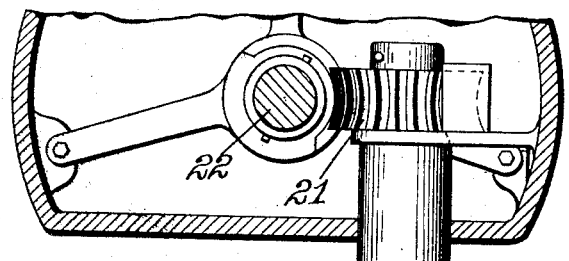
Fig. 6.
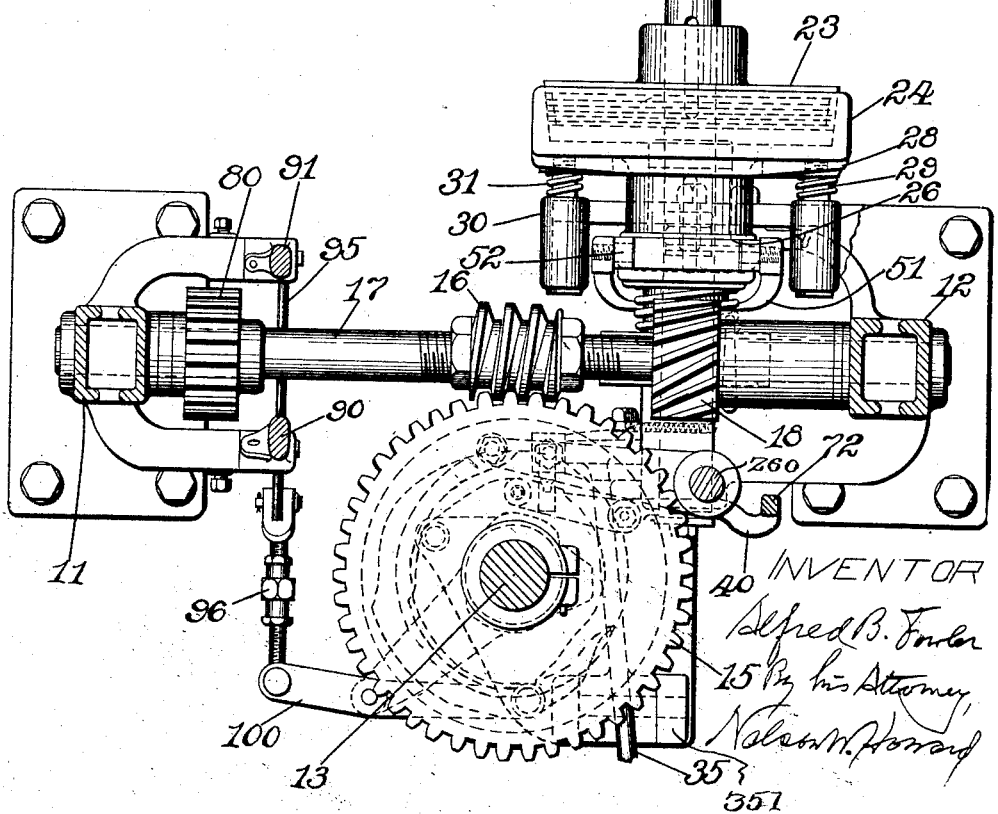

May 31, 1927.

A. B. FOWLER 1,630,565

HEEL MACHINE

Filed April 6 1923    15 Sheets-Sheet 8

INVENTOR-
Alfred B. Fowler
By his Attorney,
Nelson W. Howard

May 31, 1927.
A. B. FOWLER
1,630,565
HEEL MACHINE
Filed April 6, 1923
15 Sheets-Sheet 9
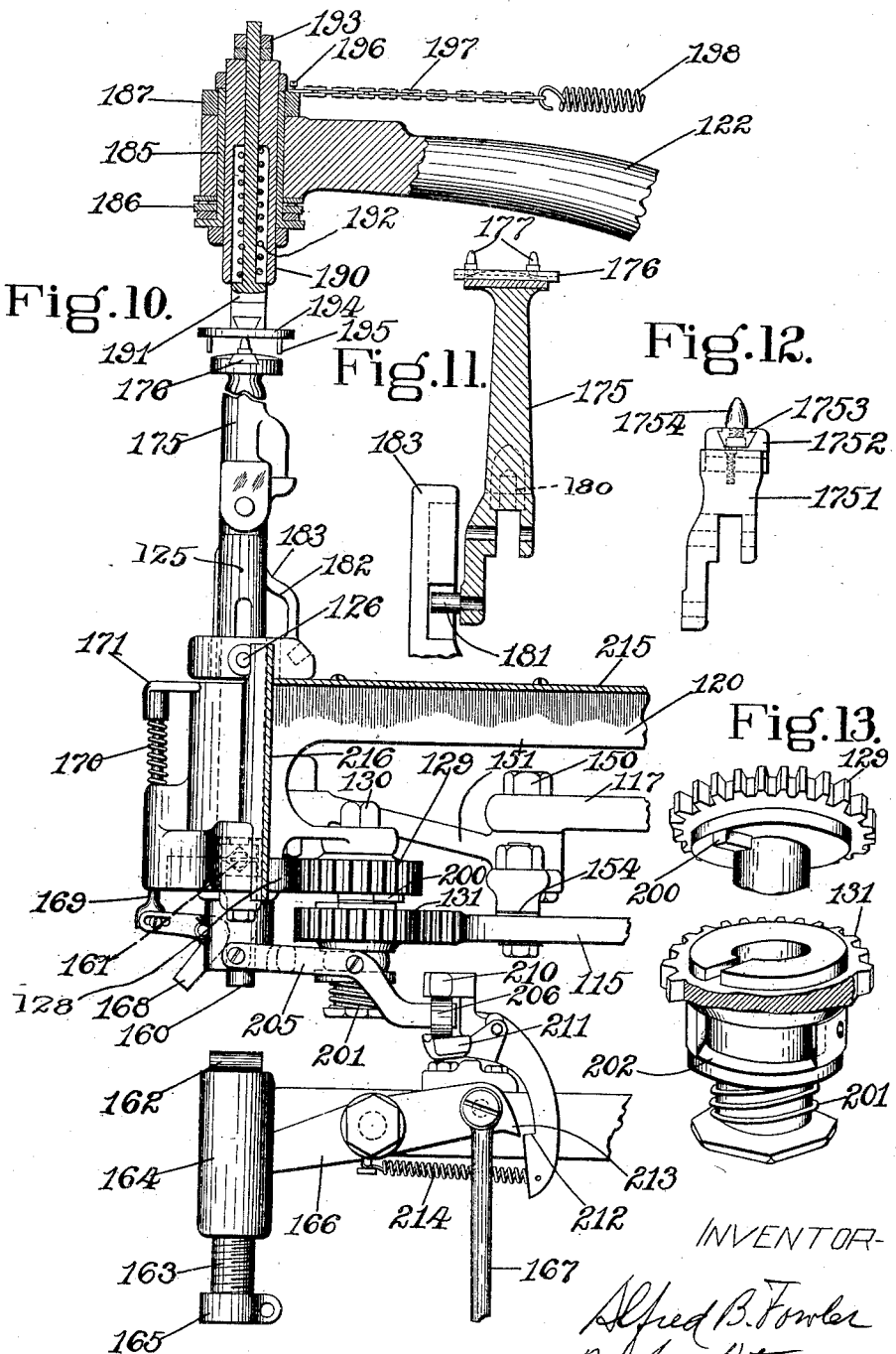
INVENTOR-
Alfred B. Fowler
By his Attorney,
Nelson W. Howard May 31, 1927.  
A. B. FOWLER  
HEEL MACHINE  
Filed April 6, 1923   15 Sheets-Sheet 10

1,630,565

INVENTOR  
Alfred B. Fowler  
By his Attorney  
Nelson W. Howard

May 31, 1927.

A. B. FOWLER 1,630,565

HEEL MACHINE

Filed April 6, 1923

INVENTOR-
Alfred B. Fowler
By his Attorney
Nelson W. Howard

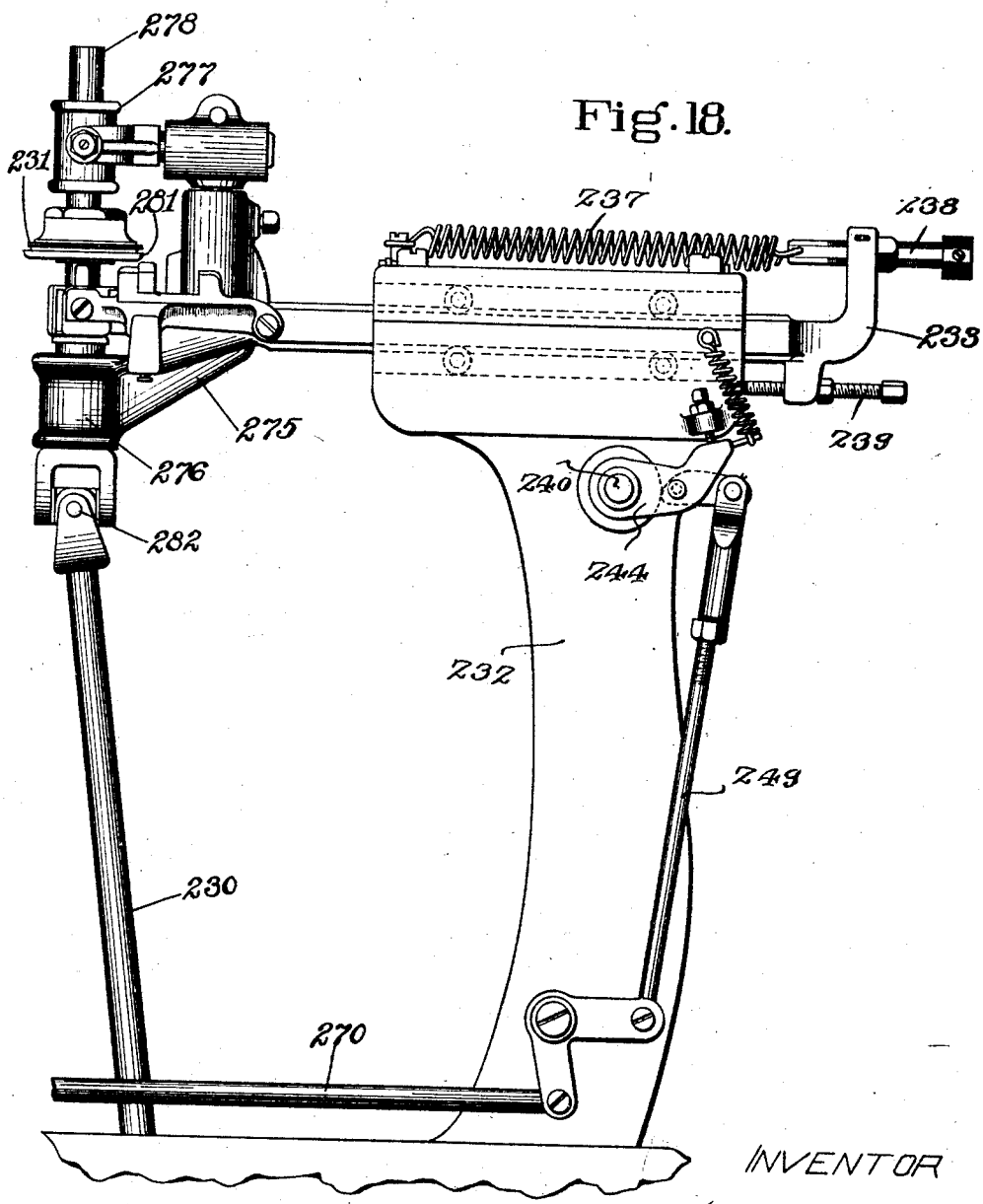

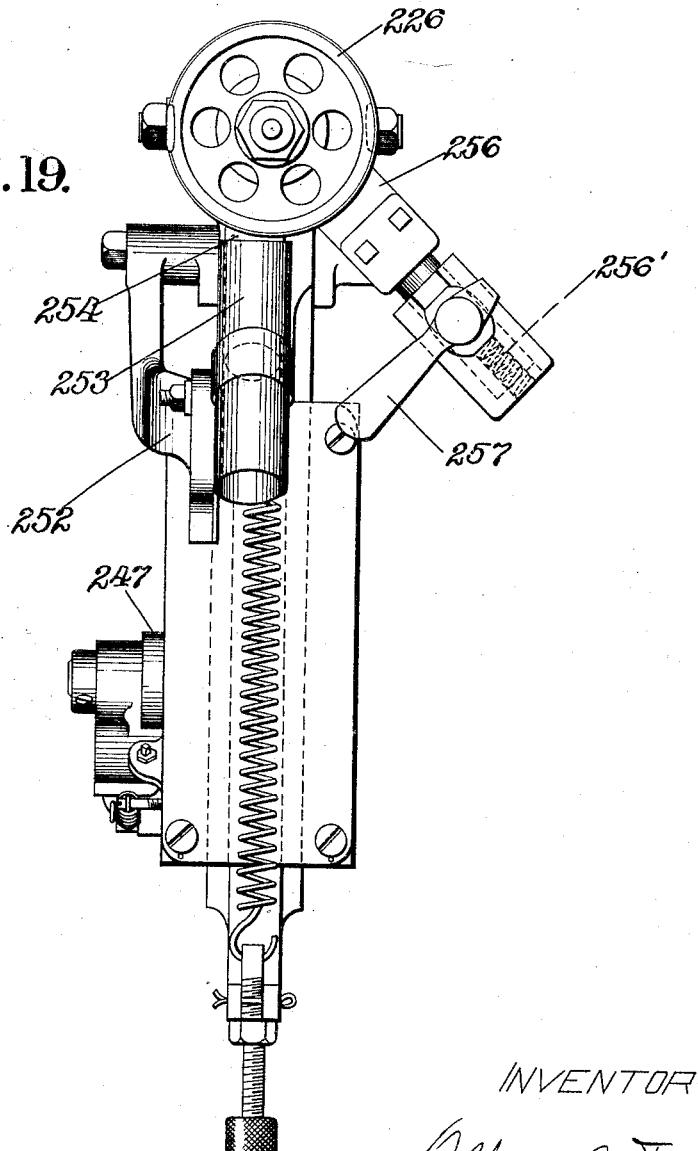

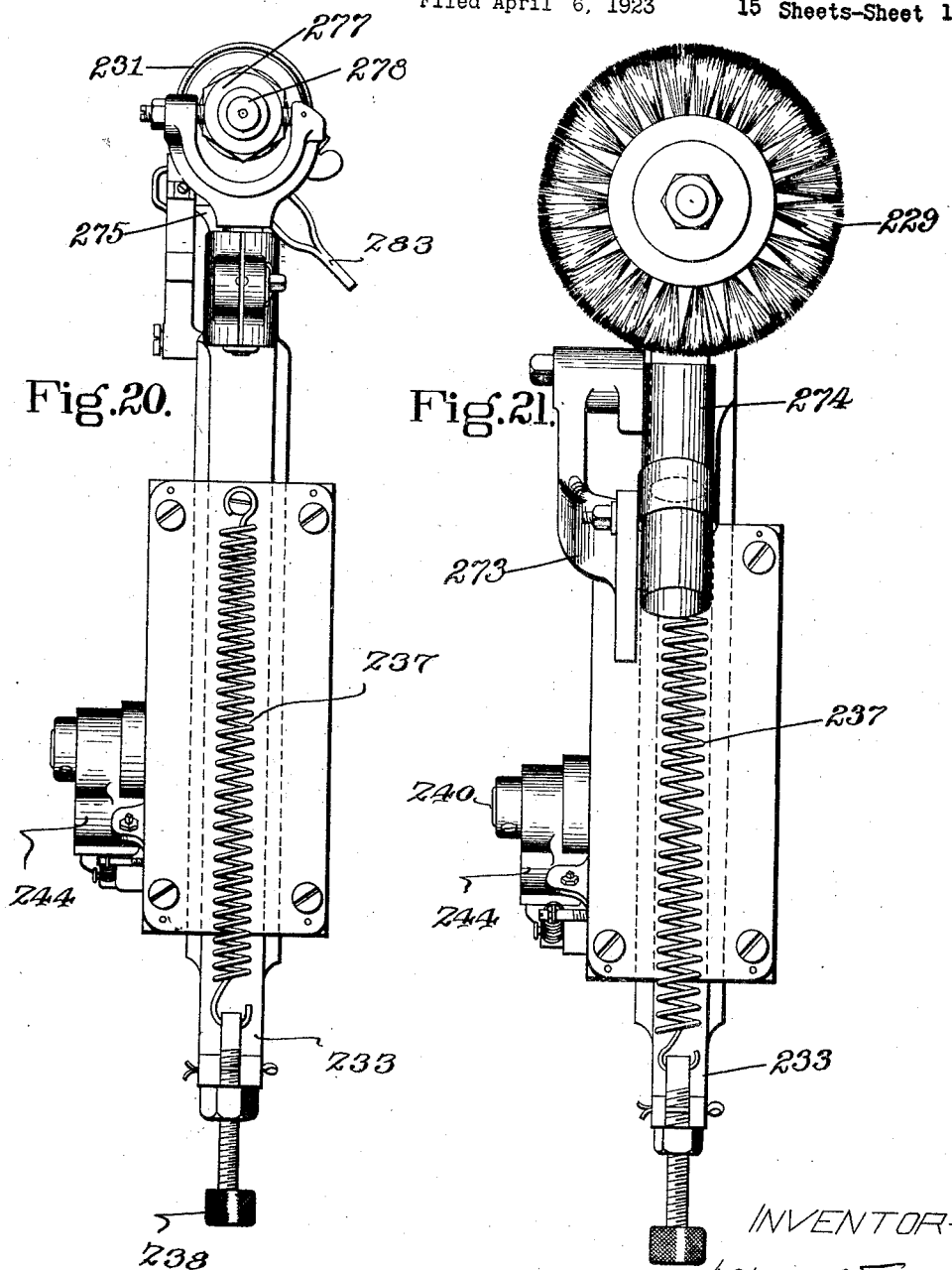

Patented May 31, 1927.

1,630,565

UNITED STATES PATENT OFFICE.

ALFRED B. FOWLER, OF BEVERLY, MASSACHUSETTS, ASSIGNOR TO UNITED SHOE MACHINERY CORPORATION, OF PATERSON, NEW JERSEY, A CORPORATION OF NEW JERSEY.

HEEL MACHINE.

Application filed April 6, 1923, Serial No. 630,335, and in Canada April 7, 1922.

This invention relates to machines for manufacturing shoes and is illustrated as embodied in a heel treating machine of the type set forth in my co-pending applications Ser. No. 265,245, filed Dec. 4, 1918, and Ser. No. 351,117, filed Jan. 13, 1920.

An object of my invention is to provide an improved machine for performing a series of operations upon the peripheral surfaces of heels and especially upon the part thereof extending around the back of the heel from one corner of the heel breast to the other heel breast corner.

Many forms of heels and especially the heels of men's shoes have a substantial part of the side faces of the heel either straight or curved on a considerable radius. These side faces are joined by a curved surface at the rear of the heel which is drawn on a radius so much shorter that its center usually lies within the tread surface of the heel. Because of this formation of the heel it is difficult to secure a proper treatment of all parts thereof simply by rotating the heel and moving either the heel or the tool toward the other to keep the two in engagement. Accordingly, my invention contemplates, among other things, an improved organization for relatively traversing the heel and the tool. In the particular embodiment which is illustrated herein and which is to be later described, the arrangement is such that the work carrier, designed to carry the work from one tool to another, moves the heel past a tool in a curve of large radius for a limited distance from one corner of the heel breast along the side, then rotates the heel upon the carrier around a center which is substantially the center of curvature of the rear portion of the heel to cause the tool to operate on this heel portion and then again moves the carrier transversely of the tool in a continuation of the first movement to cause the tool to operate on the other side face of the heel. Preferably the movement of the carrier for this operation is reverse to the movement when carrying the work from one tool to the next. This helps to prevent interference between the forepart of the shoe and the tool during forward rotation of the carrier. This also results in always bringing the work against the tool at approximately the same point in the path of movement of the active face of the tool, during all parts of the time of its presentation to the tool. Reverse rotation of the heel supporting means with respect to the carrier is also provided for in the illustrated machine when the heel is passing from one tool to the next, so as to return the work to its original position on the carrier for presentation to the next tool.

Other features of the invention relate to improved constructions and arrangements of various parts of the machine for carrying out different steps in its operation.

The above and other novel features of the invention and new combinations of parts will be hereinafter described in connection with a machine for burnishing, polishing and beading the heels of shoes but the invention in various aspects is not limited to embodiment in the illustrated machine or to machines for performing the particular operations performed by the illustrated tools.

In the drawings:—

Fig. 6 is a plan view partly in section of the driving shaft and the clutch controlling mechanism;

Fig. 10 is a detail view in elevation with parts broken away showing one of the jacks and associated parts;

Fig. 11 is a vertical section through one of the jack supports;

Fig. 12 is a view showing a modified form of jack support adapted for use with a shoe from which the last has not been removed;

Fig. 13 is a perspective view of a clutch mechanism interposed between the driving and controlling pinions for the jack spindle;

Fig. 18 is an elevation of the beading tool;

Fig. 19 is a plan view of the burnishing tool;

Fig. 20 is a plan view of the beading tool; and

Fig. 21 is a plan view of the polishing brush.

The present invention contemplates the use of a rotating turret-like table or work carrier upon which there shall be mounted a plurality of jacks or work supporting devices arranged to present several pieces of work simultaneously for operations by separate tools. These tools will be mounted in position for treatment of pieces of work at specified stations in the machine and preferably will be continuously rotated while the machine is in operation and arranged to be presented to and withdrawn from the work as the latter comes into proper position at said stations. In the particular machine herein illustrated the tools are those which are ordinarily used in a heel finishing operation and comprise a burnishing tool with wax supplying mechanism, a polishing brush and a beading tool for finishing the upper edge of the heel adjacent to the rand crease of the shoe. When the respective heels have been treated by the tools the table is automatically rotated to advance the heels to the succeeding tools and to bring a finished heel into position at the front of the machine for unjacking and replacement by a fresh piece of work.

The particular embodiment of the invention will be more fully understood from the following description in which reference is made to the accompanying drawings.

Figure 2:
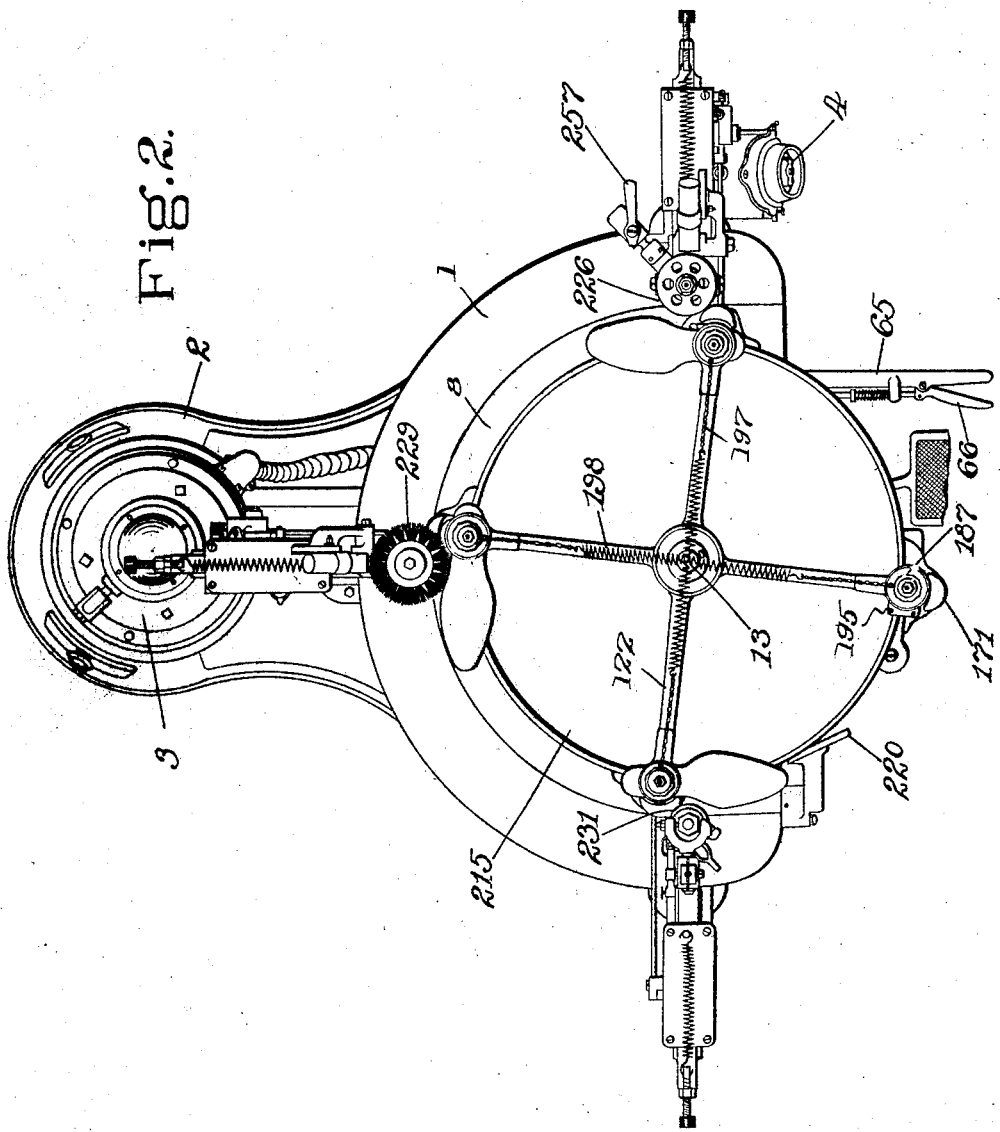
Fig. 2 is a plan view of the same, showing three shoes in the position which they will occupy just after the particular operation of each tool has been completed and as they are ready to pass on to the next tool.
Figure 3:
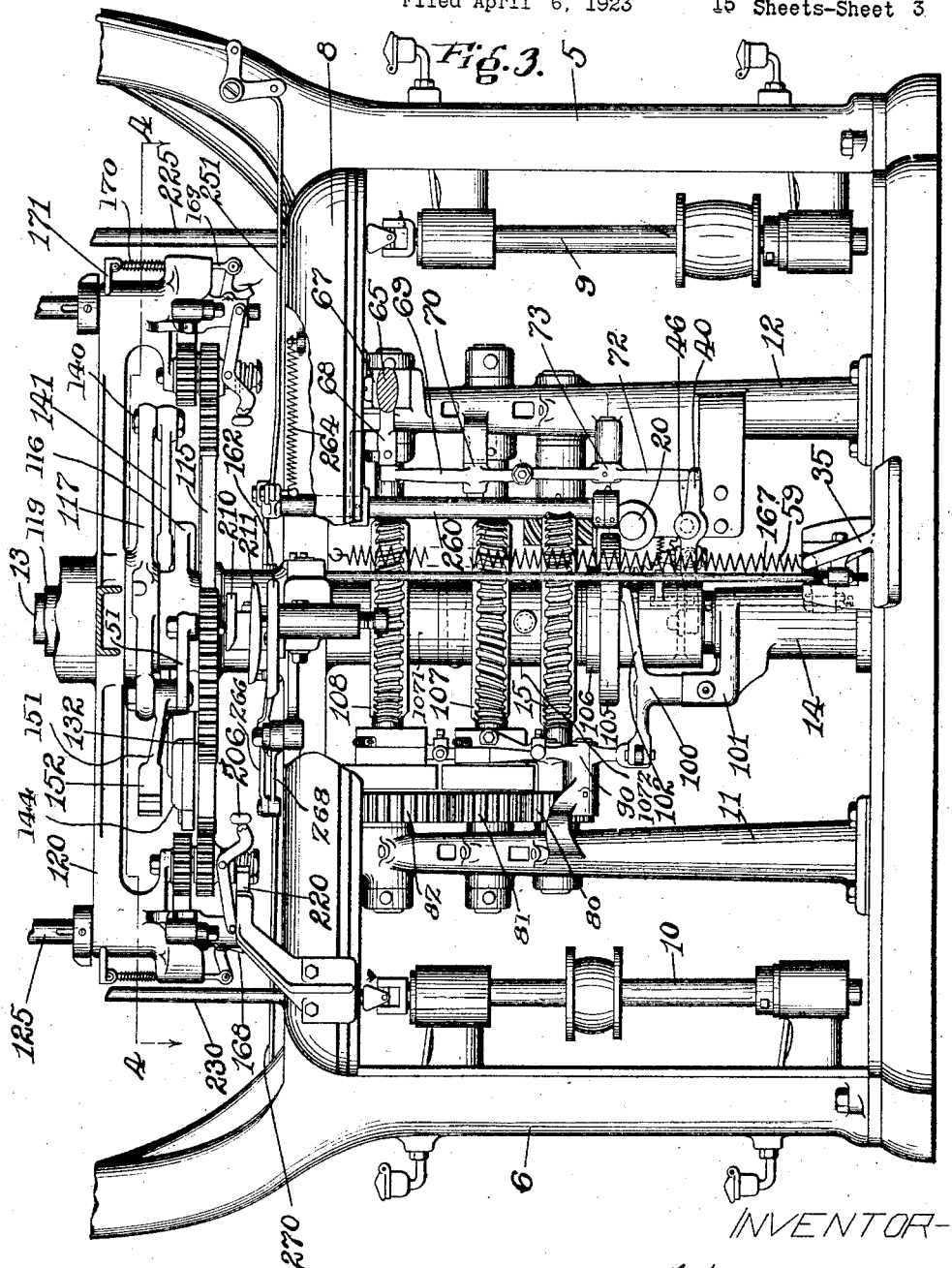
Fig. 3 is a front elevation of the lower part of the machine with the casing removed and certain parts broken away.

In general the machine comprises a base 1 of suitable shape and having a rearward extension 2 (Fig. 2) for supporting a motor 3. An electric switch 4 is provided at the front of the machine for starting and stopping the motor as desired. During the ordinary operation of the machine the motor is allowed to run continuously. At the two sides of the base suitable standards 5, 6 are provided and these, together with another (not shown) at the rear, are interconnected by a horizontal frame member 8 (Fig. 3). Suitably supported in bearings upon each of the standards are vertical shafts 9 and 10 which are provided with pulleys for belts driven from the motor 3. A similar shaft at the rear of the machine for operating the polishing brush is also belted directly to the motor.

Figure 7:
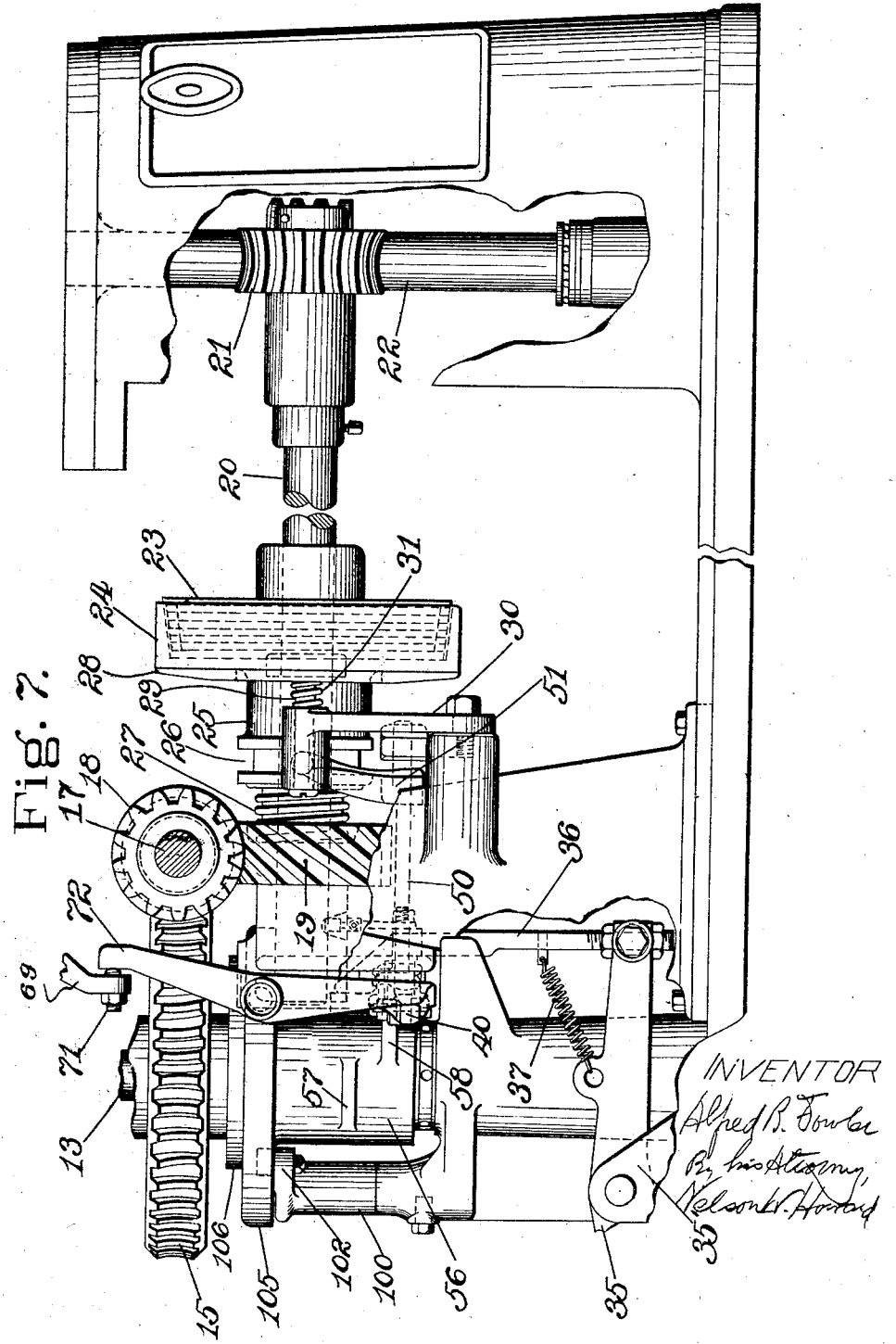
Fig. 7 is a side elevation of this same drive shaft and associated clutch mechanism.

Within the casing and mounted on the base of the machine are two suitable standards 11 and 12 designed to provide bearings for various horizontal cross shafts which will be later described. Between these standards there is a centrally disposed vertical spindle 13 which is mounted in a step bearing 14 on the base and through which, with its associated parts, the rotation of the table 120 and the movement of the jacks is controlled. Loosely mounted on the spindle 13 is a gear 15 which meshes with a worm 16 (Fig. 6) mounted on a shaft 17 supported in the standards 11 and 12. The shaft 17 is also provided with a gear 18 arranged to mesh with a worm 19 (Fig. 7) loosely mounted on the drive shaft 20. This shaft 20 is horizontally arranged and runs from the front to the back of the machine. It is supported in suitable bearings mounted on the base and is provided at its rear end with a worm and gear connection 21 to the vertical shaft 22 of the driving motor 3. Splined to the shaft 20 is a cone member 23 which is adapted to be frictionally engaged with a clutch member 24 slidable on the shaft. This clutch member 24 is provided with a hub 25 having an annular recess or groove 26 and is urged by the spring 27 which is interposed between said hub and the gear 19 to bring the clutch into driving relation with the cone 23. When the clutch member 24 is pulled out of driving relation as is shown in Figs. 6 and 7, one face thereof is brought into frictional contact with a plate 28 which acts as a brake to cause the same to stop promptly. This brake plate which is in the form of an annular plate is supported on opposite sides by pins 29 slidably supported in the upper ends of a yoke-shaped member 30 which is mounted on the frame of the machine. Springs 31 are interposed between the upper ends of the yoke 30 and the annular plate 28 to maintain the plate in braking contact with the clutch member 24 when the same is pulled back into engagement with said plate.

Figure 9:
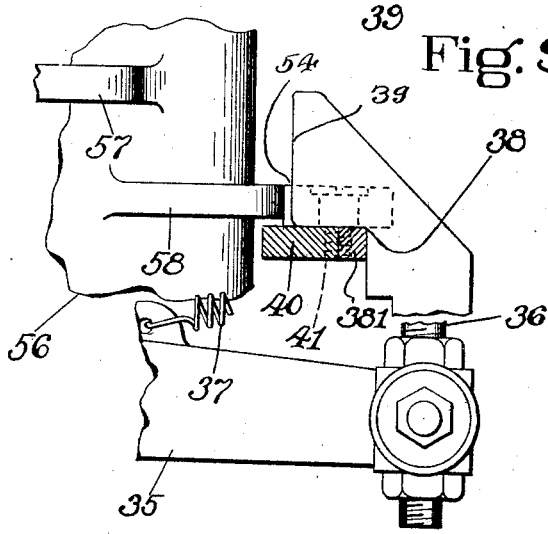
Fig. 9 is a detail section taken on the line 9—9 of Fig. 15 showing the connection between the operating treadle and the main clutch controlling mechanism.
Figure 15:
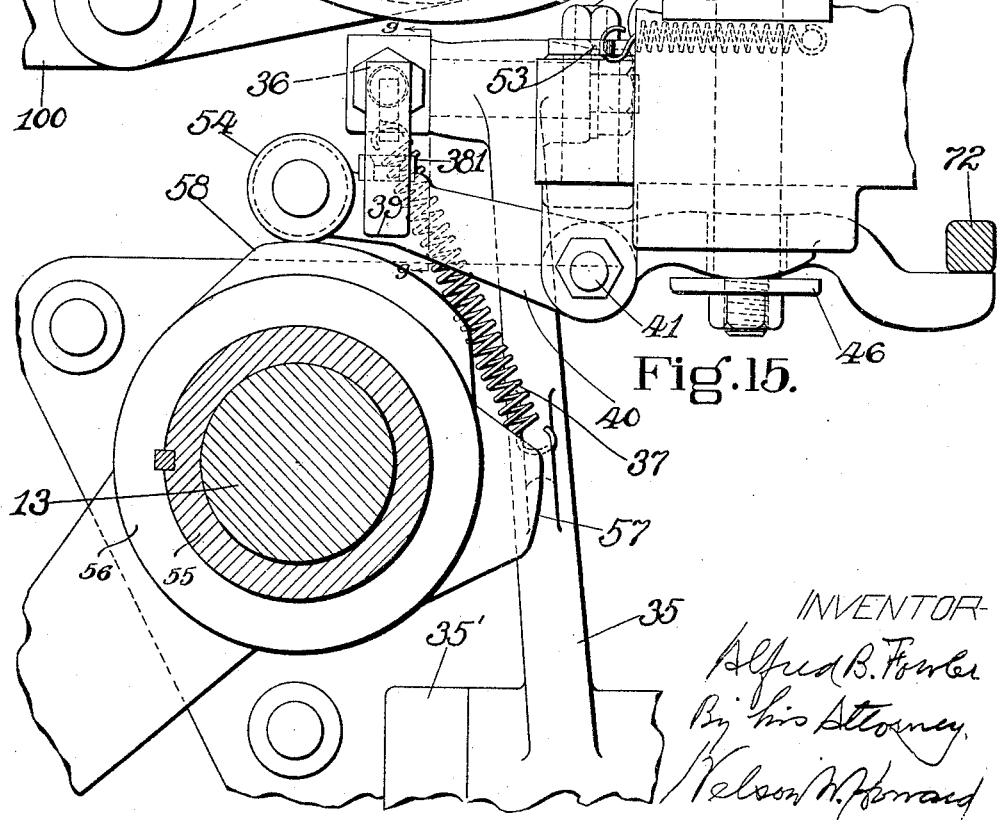
Fig. 15 is an enlarged plan view of the clutch controlling cams.

For the control of the clutch mechanism the machine is provided with a treadle 35 (Figs. 3 and 4) which is pivotally mounted upon a bracket 35′ (Fig. 7) attached to the base of the machine and this treadle has pivotally attached to its rear end an upright rod 36 whose upper end is pulled forward by a spring 37. The forward end of the treadle is urged upwardly by a spring 59 (Fig. 3). The upper end of the rod 36 is notched at 38 (Fig. 9) for engagement with a hardened steel plate 381 (Fig. 15) on a rocking lever 40 which is vertically pivoted at 41 in the forked end of a stud 45 which forms a horizontal pivot in the frame of the machine. It will thus be seen that the inner end of the lever 40 is arranged for movement toward and away from the front of the machine and up-and-down as its supporting stud 45 pivots in the frame. The other end of lever 40 loosely surrounds a rod 50, back of the head 46, said rod being extended to the rear and provided with a bifurcated upward extension 51 (Figs. 6 and 7) having rollers 52 for engagement in the annular groove 26 of the clutch mechanism. It will be remembered that the spring 27 when released forces the clutch members 23 and 24 into operative engagement for communicating rotation of the motor and drive shaft 20 to the gear 15 and other mechanism of the machine. Consequently whenever the rod 50 is freed so that it may be moved to the rear the clutch members will be operatively engaged. On the other hand, when the rod 50 is moved forward the clutch members will be separated and the machine stopped in so far as its table and jack mechanism are concerned.

Figure 5:
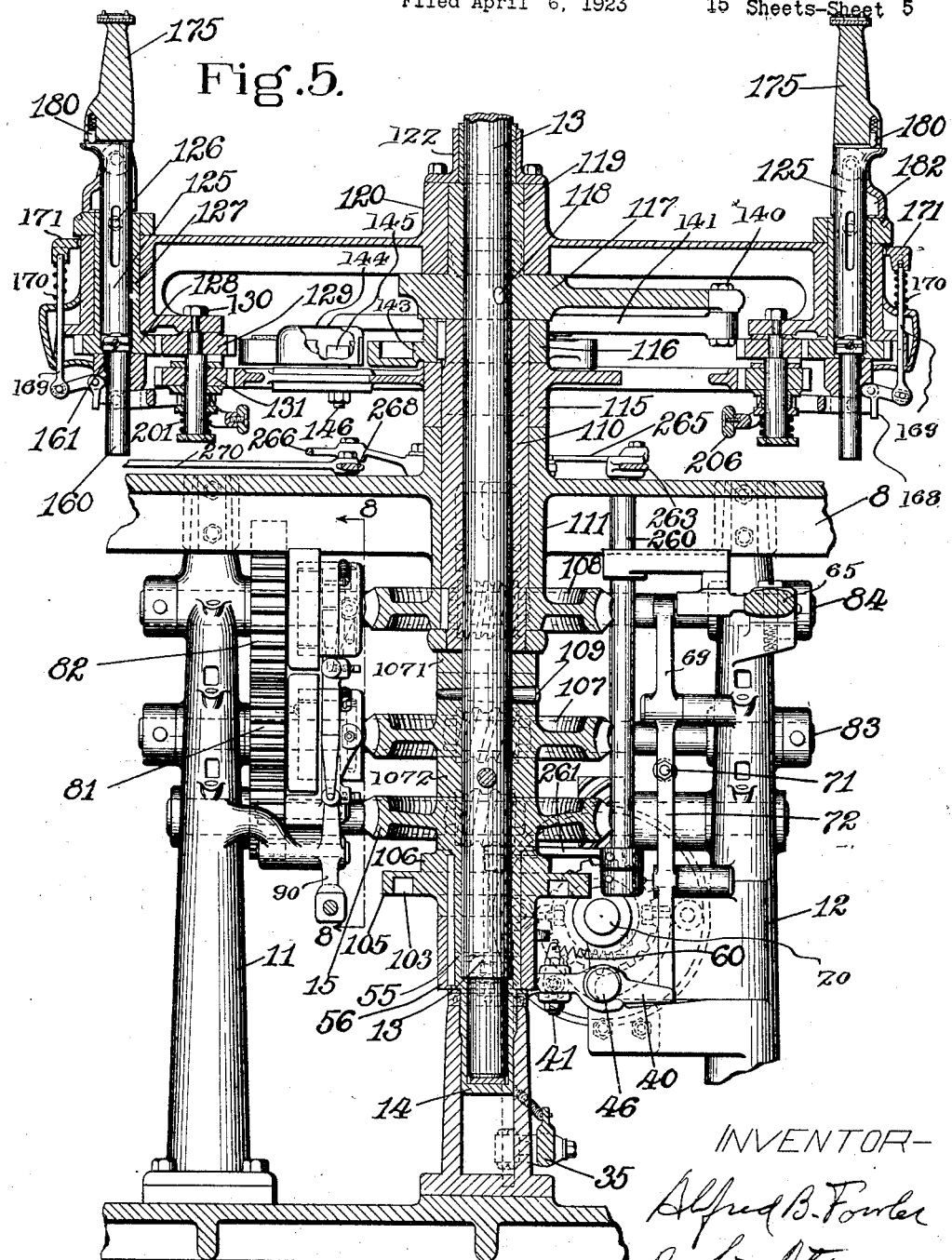
Fig. 5 is a vertical section on the line 5—5 of Fig. 4, taken through the central spindle and showing the associated gears and cams of the mechanism for controlling the table and jack.

Turning now to Fig. 5, it will be seen that the gear 15 is provided with an elongated hub member 55 which is splined to a sleeve 56 surrounding said hub member and provided on its exterior (Figs. 7 and 15) with cam projections 57 and 58. When the machine is in stopped position as shown in the drawings the cam member 58 will have engaged the outer or left-hand end of the lever 40 (see Fig. 15) and caused it to rotate about its vertical pivot 41 so that its right-hand end will have moved forward and have pulled forward the rod 50 to disengage the clutch. If the operator now desires to start the machine he will depress the treadle 35 to jack a shoe, in a manner to be later explained, and when the shoe has been properly jacked he will release the treadle so that its forward end will be raised under the action of the spring 59 and its rear end depressed, thereby pulling down on the rod 36. As the rod 36 descends (Fig. 9) the notch 38 will engage the lever 40 and, turning its pivotal support 45, will bring the said lever below the cam projection 58 thereby to allow its outer end to move forwardly and its right-hand end with the connected rod 50 to move rearwardly under the impulse of the spring 27 to bring the clutch members into operative engagement. This will transmit power from the motor to cause rotation of the gear 15 and with it the sleeve 56 and after a partial rotation the cam member 57 will come into engagement with the upper inwardly projecting end 39 of the vertical rod 36 and push the same backward against the force of the spring 37 to disengage it from the lever 40. This will allow a spring 60 (Fig. 15) attached to an upstanding lip 53 on the stud 45 to turn the stud 45 about its pivot and thereby to raise the roll 54 on the end of the lever 40 into the path of movement of the cam 58 so that when the sleeve 56 has completed one complete revolution the cam member 58 will engage the outer end of the lever 40 and cause the same to pull forward on the rod 50, thereby disengaging the clutch member 24 from the cone 23 and bringing it into frictional contact with the annular brake 28, thereby stopping the machine.

In addition to the above-described mechanism for the starting and stopping of the machine which is arranged so that in normal use the release of the jacking treadle 35 will cause the machine to start and continue in operation until the gear 15 has completed one full revolution, additional mechanism is provided for stopping the machine and allowing it to start again at any time. This comprises an emergency lever 65 (Fig. 2) which projects from the forward part of the machine in convenient position to be reached by the operator. This emergency lever 65, which is provided with a latch 66 for retaining it in any desired position, is mounted for horizontal rotation around a pivot 67 (see Fig. 3) and at its rear end is provided with an angular extension 68 (Fig. 4) for engagement with the upper end of a lever 69 pivoted at 70 (Fig. 3) on the standard 12 and provided at its lower end with an adjustable stud 71 (Fig. 7) arranged for engagement with the upper end of a lever 72 pivoted at 73 on said standard. The lower end of lever 72 is positioned for engagement with the right-hand part of the lever 40 (Figs. 3, 6 and 7) so that when the emergency lever is moved to the right it will cause the lever 69 to engage the lever 72 and the latter to pull forward the rod 50 through its engagement with the lever 40, thereby immediately disengaging the clutch and stopping the machine. When the emergency lever is released by movement to the left the clutch members will be allowed to move into engaging position and the machine will start again.

Figure 8:
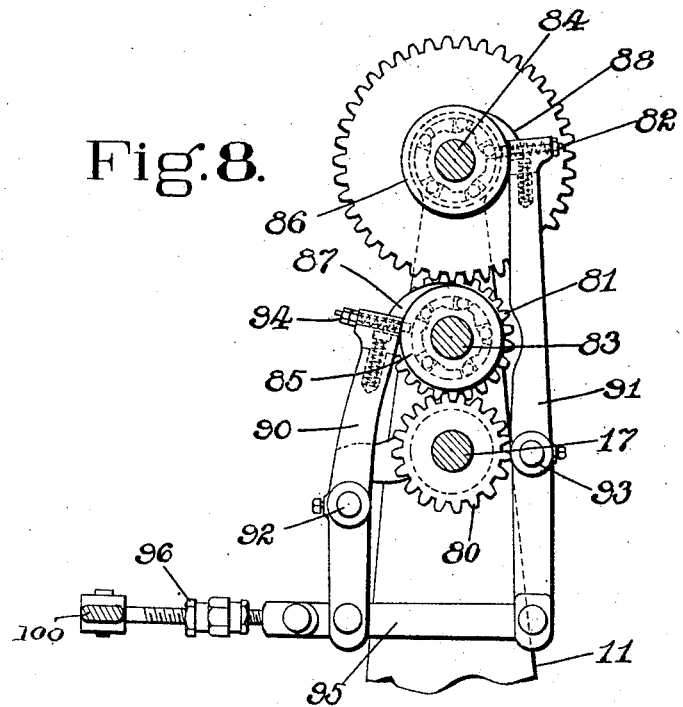
Fig. 8 is a section on the line 8—8 of Fig. 5 showing certain driving pinions and their associated clutch mechanisms.
Figure 14:
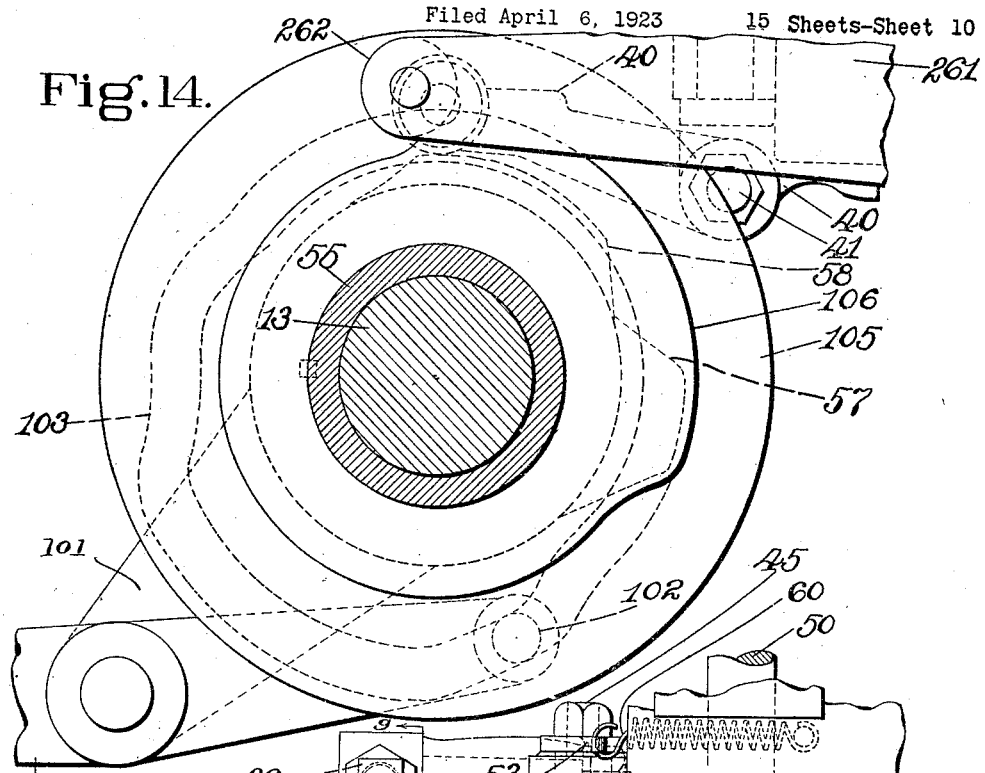
Fig. 14 is an enlarged horizontal section through the central spindle taken just above the tool controlling cam.

In order to communicate movement of the horizontal shaft 17 (Fig. 6) to the table and jack controlling mechanism there is provided a pinion 80 (Figs. 5, 6, and 8) mounted thereon adjacent to the standard 11 immediately below and in toothed engagement with pinion 81 which meshes with a pinion 82, the pinions being loosely mounted upon shafts 83 and 84 horizontally disposed in bearings provided in the standards 11 and 12 directly above the shaft 17. Immediately adjacent to the pinions 81 and 82 are suitable clutches 85 and 86 which are preferably of the well-known Horton type having projecting shoulders 87 and 88 adapted to be engaged by vertically arranged spring pressed pins in the upper ends of levers 90 and 91. These levers are pivotally mounted at 92 and 93 (see Fig. 8), upon brackets attached to the standard 11 and are connected at their lower ends by a link 95 having an adjustable connection 96 with one arm of a bell crank lever 100 (Figs. 3 and 6) which is mounted upon a vertical pivot provided in a bracket 101 on the bearing 14 at the center of the machine. The right-hand end 102 of the bell crank lever is provided with a roll for engagement in a closed cam track 103 (Figs. 5 and 14) formed in the lower face of a cam member 105 which surrounds and is splined to the hub of the gear 15. On the upper surface of the cam member 105 there is formed a cam member 106 which is arranged to bring the tools up to and away from the work at the desired times. It will be seen, therefore, that, upon rotation of the gear 15, the cam 105 will properly control the connecting link 95 between the levers 90 and 91 so that first the gear 81 is clutched to its shaft 83 and then the gear 82 is clutched to its shaft 84 for purposes to be later explained. The upper ends of the levers 90 and 91 are preferably provided with spring supported members adapted to engage the shoulders 86 and 87 of their respective clutches and the construction is such that when either of the members engages with the shoulder of its associated clutch, such clutch will be rendered ineffective and the gear or pinion with which it is associated will be operatively disconnected from its shaft. The pivoted ends of said levers may, if desired, be provided with spring pressed pins 94 (Fig. 8) for entering suitable holes in the usual cam part of the clutches to hold the respective shafts from rotation. Each of the shafts 83 and 84 is provided with a worm (see Fig. 5) to provide driving connection to gears 107 and 108. The gear 107 is pinned at 109 to the spindle 13 and the gear 108 is splined to a sleeve 110 surrounding said spindle. A suitable collar 1071, loose on the spindle 13, is interposed between the hub of the gear 107 and said sleeve 110 so that said sleeve is vertically supported in proper position with respect to the spindle and the frame of the machine and another collar 1072, pinned to the spindle 13, spaces the hubs of the gear 107 and the gear 15 which is loose on the spindle. Vertical movement of said gear is also prevented by a bearing hub 111 formed in the frame 8 of the machine.

Figure 4:
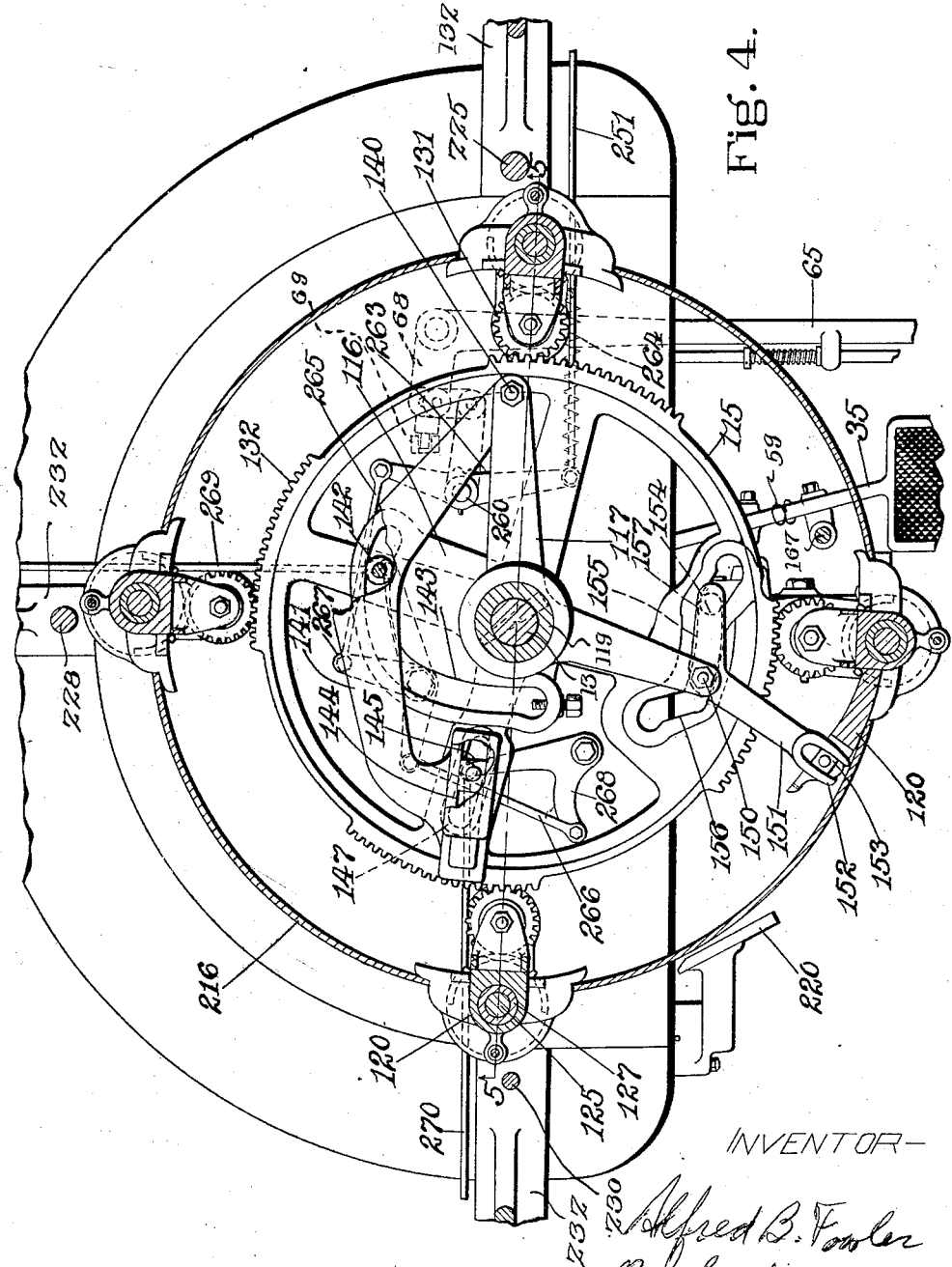
Fig. 4 is a horizontal section on the line 4—4 of Fig. 3, taken just below the rotating table to show the mechanism for controlling the movements of the table and jacks.

Referring now to Figs. 4 and 5, it will be seen that a spider 115 has its hub loosely surrounding the sleeve 110 and resting on an upstanding portion of the bearing 111 on the frame of the machine. Vertically above the hub of the spider is a cam member 116 which is splined to the sleeve 110 and above this is the hub of a fulcrum member 117 which is pinned at 118 to the spindle 13. This fulcrum member has an upwardly extending hub 119 on which is rotatively mounted the hub of the frame of the turret or table 120. In the outer ends of the arms of the frame of the table at points separated by 90 degrees are suitable jack spindles to be later described, while bolted to the upper edge of said table hub (see Figs. 1 and 5) is a member 122 comprising four diverging arms adapted to support heel plates for engagement with the treads of the heels of the shoes supported on the jacks.

Fundamentally, each of the jack members comprises a spindle 125 (Fig. 5) having a vertical slot coacting with a transverse pin 126 in a sleeve 127 mounted for rotation in the frame of the work carrying table 120 and provided at its lower end with a pinion 128. In meshing engagement with said pinion is another pinion 129 pivoted on a stud 130 mounted in the frame of the table and adapted to be clutched to a gear 131 mounted on said stud 130, directly below the pinion 129, and in position for meshing engagement with segmental gears 132 on the rim of the spider 115.

In order to effect the desired movement of the heel of the shoe past each of the various tools the turret-like table or work carrier is rotated to carry the work beyond a tool and locate it so that the breast of the heel faces away from the direction of rotation of the table and the toe of the shoe points in a clockwise direction. This rotation of the table in the particular machine illustrated is counter clockwise when viewed from above. The table with its jacks is then rotated in a clockwise direction for a short distance so that the operation of the tool starts at one corner of the breast of the heel and passes along its relatively straight face until we come to the sharply curved portion at the rear of the heel. The table is then held relatively still while the jack spindles are rotated by means of their associated pinions and move the curved part of the heel past the tool by rotation of said spindle through approximately 180 degrees. The spindle is then held relatively stationary while the table is again rotated in a clockwise direction to bring the other side of the heel past the tool. Because of the fact that the sides of the heel are relatively straight it has been found that motion along the circumference of the table which, in this particular embodiment, is about three feet in diameter, is effective to cause a satisfactory finishing of the side faces of the heels.

In order now to describe the mechanism which causes the above movements of the table and its associated jacks, let us remember first that these movements are under the control of the gears 107 and 108 (Figs. 3 and 5) and that the gear 107 is first rotated for the required amount which will thereby cause a rotation of the spindle 13 and then is stopped while the gear 108 rotates for the required amount to cause a rotation of the sleeve 110 with its associated parts. Referring now also to Fig. 4, if the parts are in the position there shown and the machine is started, rotation of the gear 107 and the spindle will cause the fulcrum member 117 to rotate counter-clockwise through approximately 90 degrees. Pivotally attached at 140 to an arm of said fulcrum member is a lever 141 having a roll 142 on its under side arranged for engagement in the cam track 143 of the cam 116 and provided at its outer end with a slide 144 for engagement with a block 145 pivoted on a stud 146 adjustably fixed in an arm of the spider 115. A slot 147 is provided in the spider 115 for adjustment of the stud 146 to provide for varying the extent of movement of the table in order thereby to make this movement correspond with varying sizes of heels. At the other end of the fulcrum member 117 there is pivoted at 150 a bell crank lever 151 having a forked end 152 engaging a pivoted block 153 mounted on the frame of the table 120. The other end of the bell crank lever 151 is provided with a roll 154 engaging the slot 155 of a cam track formed in the spider 115. As the fulcrum lever 117 is rotated through 90 degrees it will push the roll 142 along the cam track 143 of the cam 116 which, being splined to the sleeve controlled by the gear 108, is relatively stationary and will thereby swing the arm 141 around its pivot 140 to bring it closer to the center of the machine and thereby to effect a rotation of the spider 115 through the engagement of the slot 144 at the outer end of said arm with the block 145 mounted on the spider. This will carry the spider ahead of the fulcrum member and, by the inter-action of the cam track 155 with the bell crank lever 151, will cause the table to be carried along through practically 90 degrees to bring each shoe to the next operating station. At that time the roll 154 on the lever 151 will occupy the left-hand end of the cam track 155 as viewed in Fig. 4 and when the gear 108 begins to rotate carrying with it the cam 116, the cam track 143 will be moved along the roll 142 and thereby the arm 141 will be swung away from the center of the machine and cause the spider 115 to travel in a reversed direction which will be clockwise. Referring to the first part of this reversed movement the gears 132 on the spider tend to rotate the associated gears 131 and their jack spindles, but this tendency is neutralized by the fact that the left-hand end 156 of the cam track is so sloped that the table carrying with it the work will also be moved clockwise by the bell crank lever 151 through an arc sufficient to move the side face of the heel past the tool. This simultaneous movement of the table neutralizes temporarily the action of the gears 132 whose movement in mesh with gears 131 normally would cause rotation of the jack spindles. When, during the clockwise rotation of the spider 115, the roll 154 on the end of the lever 151 reaches the central part of the cam slot 155, however, the table will remain still and the rotation of the spider will be effective to rotate the jack spindles through about 180 degrees so as to bring the rear curved faces of the heels past the tools. When the roll 154 reaches the corner 157 of the cam slot a similar result will obtain as in the section 156 of the slot and the spindles will remain stationary while the table again rotates in a clockwise direction to move the spindles bodily past the tools to finish the straight faces of the other sides of the heels. In the illustrated embodiment of the machine, the point of contact of the work and the tool is always at the same point in the path of movement of the operating face of the tool and this point falls on a line connecting the center of the tool and the center of the turret.

In order more fully to understand the operation of the jack actuating mechanism it becomes necessary to describe in detail the mounting of the jack support, novel features of which are not claimed herein since they are claimed in my co-pending application, Serial No. 155,290, filed December 16, 1926, which is a continuation in part of the present application. An anti-friction bearing 161 is interposed between the lower end of the slidable spindle 125 (Figs. 5 and 10) and a stud 160 which is slidably mounted in the table 120 in alinement therewith. It is, therefore, unnecessary for the stud 160 to rotate when the spindle is being rotated. In order to jack a shoe, pressure may be applied to the lower end of the stud 160, to raise the shoe against the top lift support, by means of a plate 162 (Figs. 1, 3 and 10) which is mounted at the front of the machine on the upper end of a rod 163 mounted for vertical sliding movement in a sleeve 164 attached to the frame. A stop collar 165 is adjustably mounted on the lower end of the rod 163 to determine the limit of its upper movement when the same is actuated by means of a bell crank lever 166 also pivoted on the frame of the machine and connected by a rod 167 with the forward end of the jacking treadle 35. In order to hold the stud 160 elevated in its jacked position a cam device 168 is provided which tends frictionally to engage the side of said stud and hold it in any position of vertical adjustment. Secured to the outer end of the upper arm of said cam device 168 is a rod 169 slidably mounted in the frame of the table and normally urged upward by means of a spring 170 surrounding the rod and bearing against a hand plate 171. If it is desired manually to release the jack spindle, pressure on the hand plate 171 will turn the cam device 168 and release it from locking position. At the upper end of the jack spindle 125 there is pivotally mounted a section 175 which may carry at its upper end a suitable device for engagement with a shoe at a point in vertical alinement with the heel. In the particular embodiment shown in the drawings a plate 176 has a dovetailed mounting in the upper end of the section 175 and is provided with studs 177 (Fig. 11) for engagement with holes which are sometimes provided in the rear end of a shoe at a point where it is desired for the jack to contact with the same. If it is desired to use a shoe from which the last has not been removed then a modified arrangement such as is illustrated in Fig. 12 may be used in which the section 1751, corresponding to the section 175, is shortened and provided at its upper end with a block 1752 having a dovetailed mounting therein for movement in one direction while another block 1753 has a dovetailed mounting in the first block for movement in a direction at right angles thereto. This block 1753 is provided with a suitable stud 1754 to engage the last socket. It will be observed from an inspection of Fig. 5 that the section 175 is provided with a spring pressed plunger 180 adapted to tip this portion of the jack forward toward the operator when the jack is at the front of the machine ready for attention by the operator. When the jack spindle 125 is raised to hold the shoe rigidly in position the section 175 is automatically erected and tipping thereof is prevented by a pin 181 adapted to engage the narrow upper end of a slot 182 formed in a member 183 which is secured to the upper end of the sleeve 127. This slot 182 is widened at its lower end (see Figs. 5 and 10) so that when the jack spindle has been released and dropped, the pin 181 will have room to swing and allow the spring plunger 180 to tip forward the shoe supporting section 175.

On the outer end of each of the arms 122 (Fig. 2) extending out over the jack spindle there is revolubly mounted a sleeve 185 (Fig. 10) having an anti-friction bearing at 186 with the lower surface of the arm and retained in position therein by a collar 187. Mounted within this sleeve and revoluble therewith is a stud 190 within which there is slidably mounted a rod 191 spring-pressed downwardly by means of a spring 192 with the downward limit of movement adjustably determined by nuts 193. At the lower end of this rod 191 there is provided a suitable top lift engaging plate 194 having pins 195 for engagement with the breast of the heel. Connected with the collar 187 by means of a screw 196 is a short piece of chain 197, the loose end of which is connected by means of a suitable spring 198 (Fig. 2) to the loose end of the chain on the opposing arm. When the shoe has been unjacked, this spring will rotate the top lift plate 194 so that the pins 195 will be at its left hand edge ready for engagement with the breast of the heel of the shoe to be jacked therein thereby to guide the operator in jacking the shoe.

Figure 1:
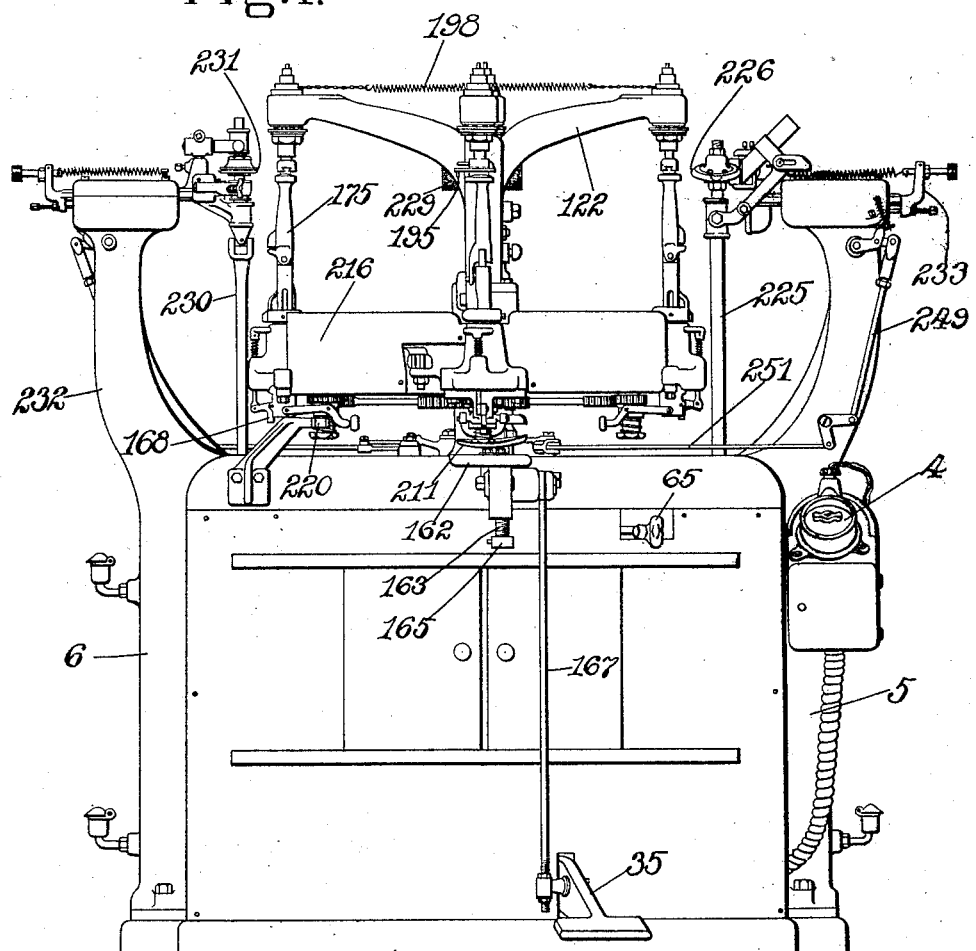
Figure 1 is a front elevation of the machine.

In order to prevent rotation of the jack spindle by relative movement of the gear 132 when said spindle is at the jacking position at the forward part of the machine there is provided a dog clutch 200 (Fig. 13) between the pinions 129 and 131 and this clutch is normally held in operative engaging position by a spring 201 surrounding the stud 130 and bearing against a nut on the lower end thereof. The hub of the gear 131 is provided with an annular recess 202 in which there engages the arms of a bifurcated lever 205 pivotally mounted on that portion of the frame 120 of the turret which surrounds the lower end of the stud 160 and said lever 205 is provided at its outer end with a roll 206. When the jack approaches the forward part of the machine this roll is adapted to enter a path provided between an upper fixed member 210 and a lower pivoted member 211 (Figs. 1, 3 and 10). Engagement with the upper member serves to lower the roll 206 and disengage the clutch 200. This member 211 is extended downwardly at the rear and is provided with a notch 212 for engagement with the pointed end 213 of the lever 166 to which the treadle rod is connected. It will be observed that the engagement of the notch 212 with the end 213 of said lever 166 makes it impossible to depress the treadle for jacking a shoe until the roll 206 has entered the path provided between the members 210 and 211. Suitable cover members 215 are provided between the arms of the rotating table to exclude the dirt from the operative parts and cover members 216 are provided around the circumference of said table for a similar purpose. In order to release the jack spindle as it approaches the unjacking position and to cause the shoe to fall forwardly, a suitable tripping member 220 is mounted on the frame of the machine (see Figs. 1, 2 and 3) in position for engagement with the lower end of the cam member 168. This tripping member 220 has its surface suitably formed to push the lower end of the locking member 168 inwardly toward the center of the machine against the force of the spring 170 and thereby to release the jack spindle which will fall under its own weight.

In order that there may be no danger of interference between the tools and the work at times when the work is passing from one station to another provision is made for moving the tool carrying shafts toward and away from the work at the desired time. It will be noted from an inspection of Fig. 1 that a shaft 225 is provided for rotating a burnishing iron 226. A shaft 228 (Fig. 4) at the rear of the machine has mounted on its upper end a polishing brush 229, while at the left side of the machine is a shaft 230 which is arranged to drive a beading tool 231. A universal joint (see Fig. 3) is provided between each of these shafts and the driving shafts, such as 9 and 11, so that it is possible by proper devices, to be later described, to cause the tools to approach the work or recede therefrom at suitable intervals.

Figure 16:
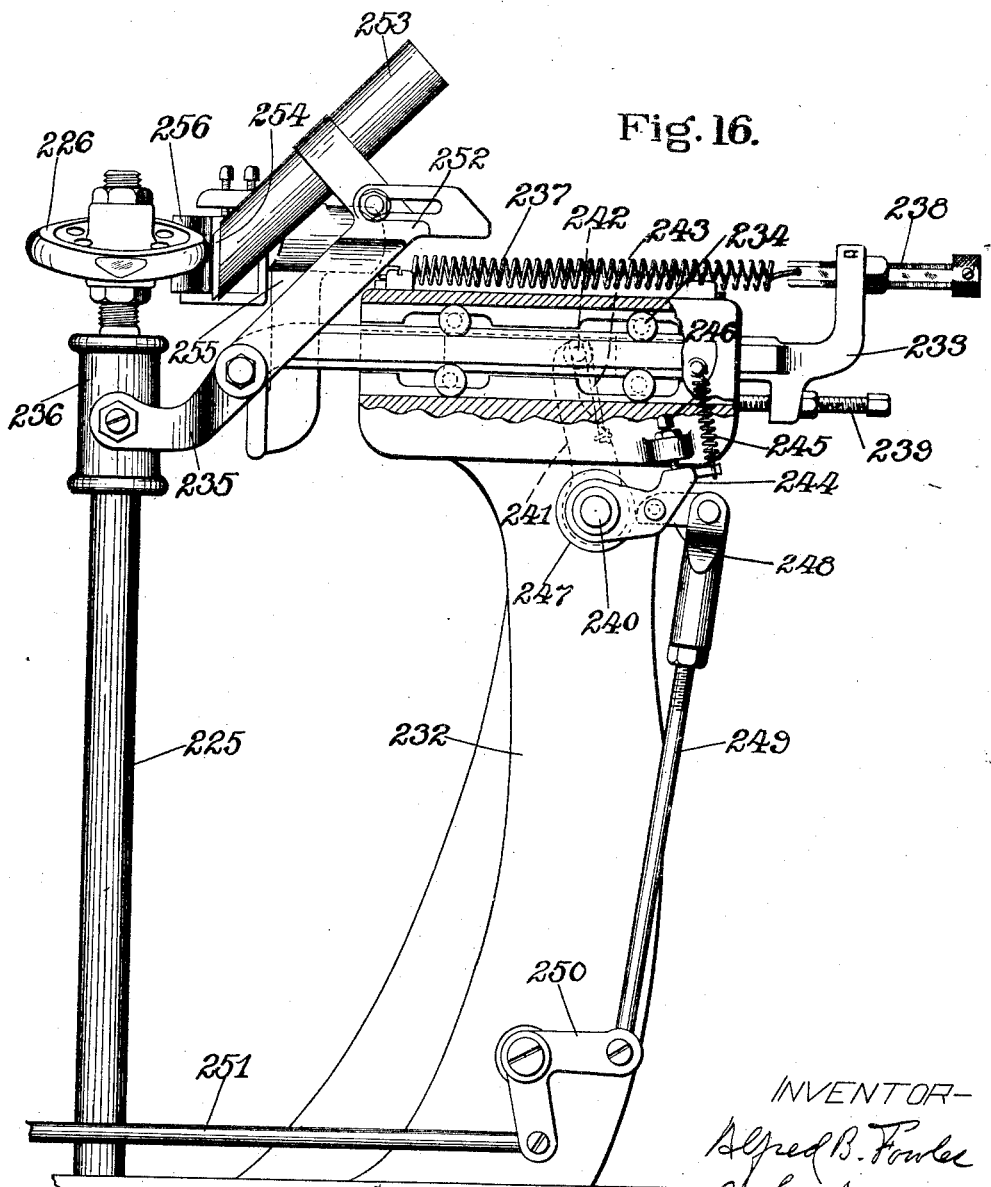
Fig. 16 is an elevation, with parts broken away, of the burnishing tool and its support.

It will be seen from Fig. 16 that, in a standard 232 forming part of the frame of the machine, there is provided a slide 233 having anti-friction rollers 234 between it and its bearing. Connected to the forward end of the slide 233 is a yoke 235 whose forked end surrounds a collar 236 on the driving shaft 235. Any motion communicated to this slide 233 will, therefore, be passed on to the operating tool. For the purpose of urging the tool toward the work there is provided a spring 237 one end of which is attached to the standard 232 and the other end of which is adjustably connected by means of a screw 238 to the outer end of the slide 233. In order to limit the inward movement of the slide a suitable stop screw may be mounted in a depending lip on the slide and arranged to engage with the frame of the machine. Movement of the slide away from the work is effected through a bell crank lever pivoted at 240 in the frame of the machine and having an upstanding end 241 adapted to enter a slot in said slide and engage a pin 242 therein, being held against said pin by a flat spring 243. The other arm 244 of the bell crank lever is urged upwardly by a spring 245 and contacts in one position with a stop screw 246. Pivoted to the back side of the arm 244 of said lever and adapted to contact with a circular surface 247 formed on the hub of the lever is a pawl 248 whose end is so formed that it will bite said circular surface 247 when the outer end of said pawl is depressed to cause rotation of the bell crank lever in a clockwise direction and move the tool away from the work. A rod 249 is connected to the end of said pawl. Motion is communicated to said rod through a bell crank lever 250 from a rod 251. The particular form of burnishing iron herein illustrated forms no part of the present invention and comprises an elliptical disk so tilted on the driving shaft 225 that the plan view thereof is a circle and the distance between the upper and lower edges thereof is essentially equal to the height of the heel to be burnished. The yoke 235 has an upwardly and rearwardly extending arm 252 (see also Fig. 19) which serves as a support for a tube 253 containing a stick of wax 254, while another arm 255 extending from said yoke constitutes a support for a heater block 256 which may be moved against the iron by a spring or withdrawn by means of a handle 257 (see Figs. 2 and 19) should the iron become overheated.

Similar sliding supports are provided for the polishing brush and the beading tool and in order to actuate the rods 251 to withdraw the tools from the work there is provided a vertical shaft 260 pivoted in the frame of the machine and having at its lower end an arm 261 (Fig. 5) which is provided with a depending roller 262 (Fig. 14) adapted to engage the peripheral surface of the cam 106 which, it will be remembered, is formed as a part of the cam 105 and rotates but once for each operation of the machine. On the upper end of the shaft 260 is a bell crank lever 263 (Figs. 4 and 5) and the forwardly extending end of this lever is pivotally connected to the rod 251 which is arranged to retract the burnishing iron. A spring 264 (Figs. 3 and 4) tends to turn the shaft 260 in a counter-clockwise direction as viewed from above and to hold the roll 262 against the surface of the cam 106. The other arm of the bell crank lever 263 is connected by rods 265, 266 through bell crank levers 267 and 268 which are arranged as is shown in Fig. 4 to actuate rods 269 and 270 passing to the retracting mechanisms of the polishing brush and beading tool, respectively. The emergency lever is connected by links shown in Figs. 3 and 4 to the shaft 260 so that actuation of said lever serves to withdraw the tools from the work, except when the machine is in stop position.

Figure 17:
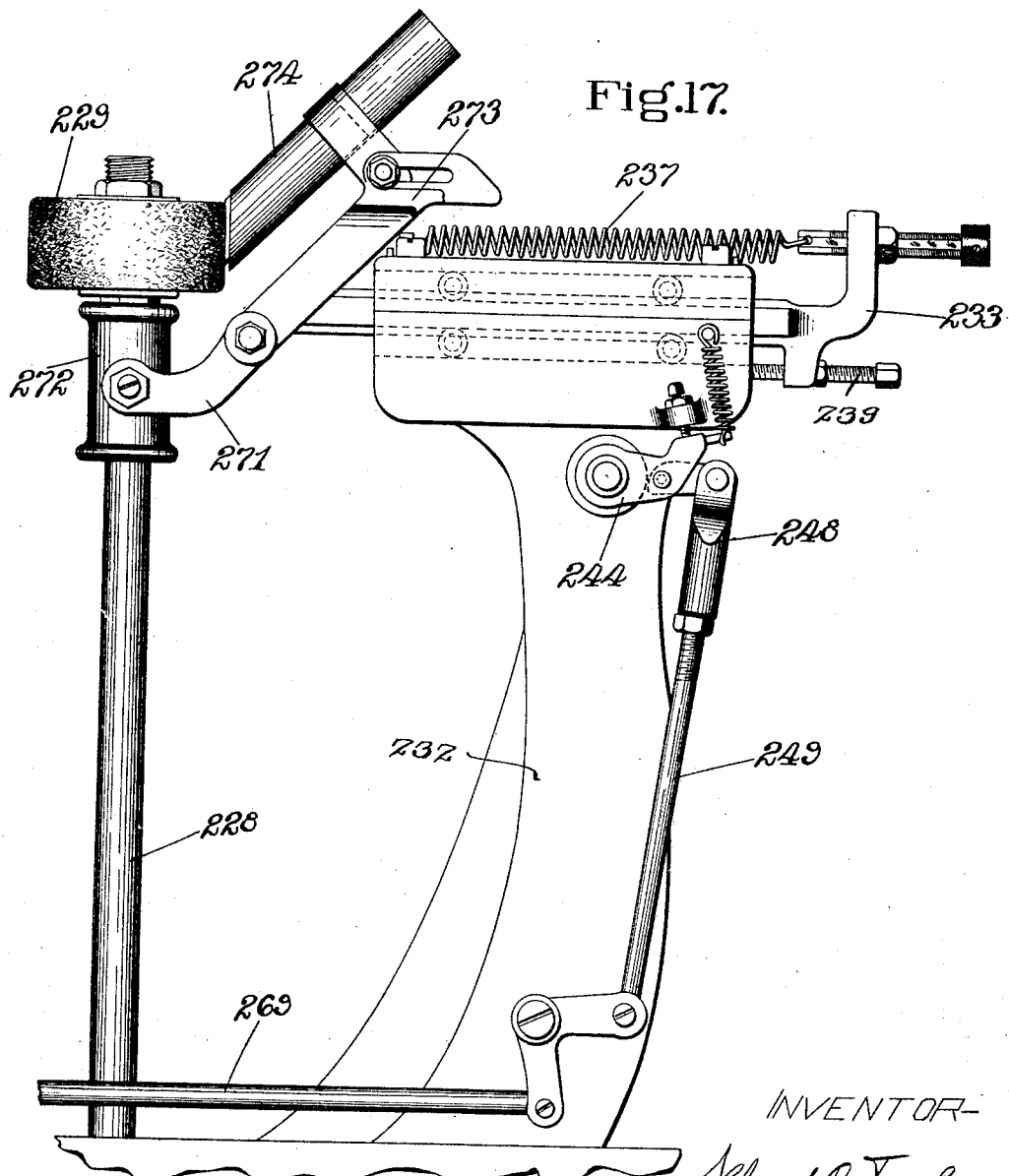
Fig. 17 is a similar view of the polishing brush.

The slide 233 for the polishing brush (Figs. 17 and 21) is exactly similar in construction to that used with the burnishing iron and the only notable difference in this arrangement is that the yoke 271 on the sleeve 272 surrounding the driving shaft 228 is provided with only one upstanding arm 273 in which there is mounted a holder 274 for holding a stick of wax which is held by gravity against the surface of the brush unless the operator tilts the holder 274 to remove the wax from the brush.

The third operation performed by the particular embodiment of the invention shown in the drawings is that of beading the upper edge of the heel adjacent to the rand crease and polishing the chamfered edge of the sole. In the arrangement shown in Figs.

18 and 20 a slide 233, such as was shown in connection with the other tools, has connected to its forward end a bracket 275 having bearings 276 and 277 for the stub shaft 278 on which is mounted the beading tool 231. Formed with the beading tool is a circular flange 281 adapted to enter the rand crease in the shoe and finish the chamfered edge of the sole thereof and at the same time ensure the proper location of beading tool 231 with respect to the heel. Inasmuch as the stub shaft 278 must be located in an approximately vertical relation to the machine it is necessary to provide an additional universal joint 282 between it and the driving shaft 230. A frictional heating device 283 may be applied to the rotating parts.

From the above description it will be seen that the machine is adapted to perform the three operations of burnishing, polishing and beading the heel of a shoe and it is within the scope of the inventon that the heel should be so treated either before or after its attachment to the shoe. In operating the machine, the operator will place a shoe or heel on the upper portion 175 of the jack support so that the breast of the heel rests against the gaging pins 195 of the top lift plate 194. He will then depress the treadle to raise the work into firm engagement with said plate against the action of the spring 192 to an extent which will be determined by the adjustment of the collar 165. This adjustment of said collar 165 will bring the work into the proper relation to the burnishing iron, and polishing brush and especially the location of the rand crease with respect to the beading tool and may be varied whenever the style of work being handled by the machine is changed. Assuming that the motor 3 is rotating, no operation will take place upon the depression of the treadle except to jack the shoe but, as soon as the treadle is released, lever 40 will be pulled out of engagement with the cam 58 and allow the driving clutch to be spring-pressed into operative engagement, thus starting rotation of the gear 15 and the cams 105, 106, 57 and 58 which are connected thereto. By the action of the Horton clutches, first the gear 81 and then the gear 82 will be connected to its respective shaft so that it will rotate the spindle 13 and then the sleeve 110. This will cause the table to rotate through approximately 90 degrees and it should be noted that during the rotation of the table from the jacking position to the first work station, there will be a relative movement of the spider 115 which will rotate the gear 131 of that spindle on which the work has just been mounted and thereby bring the parts of the dog clutch 200 into position to snap into engagement so that in subsequent movements of the machine the rotation of the gear 131 will be communicated to the jack spindle. Between other stations of the machine the movements of the spider 115 will cause a rotation of any particular jack spindle, as it approaches and passes the corresponding tool, to bring the work back to its original position so that when the machine is viewed from above, the toe of the shoe will point in a clockwise direction around the table or a direction opposite to that shown in Fig. 2. Movement of the table will be such as to carry the corner of the breast of each heel and its side beyond the operating tools. The table will then rotate slightly in a clockwise direction so that the various tools will operate along the straight sides of the heels, then as the roll 154 on bell crank lever 151 (see Fig. 4) passes along the central portion of the slot 155 there will be no rotation on the table but a movement of the spider 115 will cause a rotation of the various jack spindles (except of course that at the jacking station) and cause the tools to operate upon the curved rear surfaces of the heels. There will then be a further rotation in a clockwise direction of the table which will bring the other straight sides of the heels past the various tools to finish the work upon each heel. The arrangement of the parts is such that about one-fifth of the operating time is expended on each side face and three-fifths of the time is expended on the curved surface of the heel, thus treating approximately equal areas in equal units of time.

The reason for and the advantages of the particular method employed in causing the work to traverse the tool will be better understood from a consideration of the possible results if the machine had been designed so as to cause the work to be presented to the tools during the forward or counterclockwise rotation of the turret. It will be observed that the proper positioning of the heel upon the turret (see Fig. 2) to cause the required co-action of the tool with one side face of the heel requires the ball of the shoe to project beyond the circumference of the turret. If, then, the shoe is to occupy the position shown in Fig. 2 at the time when a piece of work upon the turret is approaching a corresponding tool, and it will be remembered that at this time the tools are being moved forward toward the turret, then there would be great danger of interference between the ball of the shoe and the tool as the heel approaches the position for co-action with the tool. On the other hand, with applicant's arrangement, the forepart of the shoe is turning away from the tool, starting from the position shown in Fig. 2 where it is leaving the tool to proceed to the next tool, and is pointing toward the center of the turret at the time when any piece of work is passing by a corresponding tool to bring it into a position the reverse of that shown in Fig. 2 for the commencement of the operation of the tool upon the heel. The sequence of operations while the tool is operating on a heel continues to turn the forepart of the shoe away from the tool toward the center of the turret so that there is no opportunity for damaging the shoe at this time.

It will be observed that the safety catch 212, 213 absolutely prevents the operator from depressing the treadle until the table has reached a position so that one jack is at the front thereof. Furthermore, it is not the depression of the treadle which starts the table along to its next operating station but the release thereof, hence the operator is safe-guarded against starting the rotation of the table until he has finished jacking the shoe.

Having described my invention, what I claim as new and desire to secure by Letters Patent of the United States is:—

1. In a machine of the character described, a plurality of tools adapted for operating upon a shoe heel and arranged in a circle, a turret rotatable about the center of said circle and carrying a plurality of work supporting devices each rotatably mounted on the turret, means for intermittently rotating said turret to transfer a heel to said tools successively, means for intermittently rotating the work-supporting devices relatively to the turret, means for effecting intermittent reverse rotation of the turret in the direction opposite to the direction of its work-transferring movement, and controlling means constructed and arranged to cause rotation of the work-supporting devices relatively to the turret while the turret is stationary and between two reverse movements of the turret.

2. In a machine of the character described, a plurality of tools adapted for operating upon a shoe heel and arranged in a circle, a turret rotatable about the center of said circle, a plurality of work-supporting devices mounted on the turret, means for intermittently rotating said turret to transfer a heel to said tools successively, and means for effecting intermittent reverse rotation of the turret in a direction opposite to the direction of its heel-transferring movement.

3. In a machine of the character described, a plurality of tools adapted for operating upon a shoe heel and arranged in a circle, a turret rotatable about the center of said circle, a plurality of work-supporting devices mounted on the turret, means for intermittently rotating said turret to carry a heel from one to another of said tools successively and beyond the tool approached, and means for effecting intermittent reverse rotation of the turret in a direction opposite to the direction of its work-transferring movement to bring the heel into operative relation to the tool approached.

4. In a machine of the character described, a rotatable turret, a plurality of tools located in a circular path arranged concentrically with said turret and in position for operation upon work carried by the turret during rotation of the turret, work-supports rotatably mounted on the turret, and mechanism to rotate said turret intermittently to carry a piece of work past a tool in engagement therewith to transfer the work from one tool to the next and to rotate said work-supports relatively to the turret to bring opposite faces of the work into position for engagement with the tools when the turret rotates.

5. In a machine for operating upon a peripheral surface of a heel, a heel-treating tool, a movable work-carrier, a work support rotatably mounted on said carrier, and power means constructed and arranged to effect a combined movement of the carrier and rotation of the support relative to said tool to cause the tool to act first upon one of the lateral faces of the heel and then upon a curved intermediate portion of the periphery of the heel and finally upon the other lateral face of the heel progressively in a single direction around the work.

6. In a machine for operating upon a peripheral surface of a heel, an operating instrumentality, a movable work carrier, a work support rotatably mounted on said carrier, and cam controlled means for effecting a combined movement of said carrier and rotation of the support on the carrier to cause the work to traverse the operative instrumentality constructed and arranged so that the tool will act first upon one of the lateral faces of said heel and then upon a curved intermediate portion and finally upon the other lateral face of the heel progressively in a single direction around the work.

7. In a machine for operating upon a peripheral surface of a heel, a heel-treating tool, a movable work-carrier, and power means for effecting relative movement of said tool and said carrier constructed and arranged to carry the heel into and beyond its operative position with relation to said tool and then to reverse and carry the heel back into its operative position.

8. In a machine for operating upon a peripheral surface of a heel, a heel-treating tool, a work-carrier, and cam-controlled means for moving said carrier to carry the heel into and beyond its operative position with relation to the tool and then to reverse the carrier to carry the heel back into its said operative position.

9. In a machine for operating upon the peripheral surface of the heel of a finished shoe, a heel treating tool, a movable work carrier, and power means for effecting relative movement of said tool and said carrier constructed and arranged to carry the shoe over and past a radial line between the center of the carrier and said tool with the forepart of the shoe pointed away from the tool and then to bring the work around into a position substantially tangential to the carrier so as to bring the side face of the heel into a position suitable for the operation of the tool when the carrier moves back and then to reverse the carrier to carry the heel back into operative relation to the tool to treat the side face of the heel.

10. In a machine of the character described, a plurality of operating instrumentalities, a work carrier movable in a predetermined direction past said instrumentalities, a work support rotatably mounted on said carrier, means for moving the carrier, means for rotating the support, and cam means for controlling the two last-named means constructed and arranged to cause the carrier to move in a reverse direction opposite to said predetermined direction so that the work will traverse the operating instrumentality and arranged then to hold the carrier stationary while it causes the work support to rotate upon the carrier so that the operating instrumentality will traverse a curved surface of the work and arranged then to cause the carrier to move again to effect another reverse transverse movement of said carrier and its work past the operating instrumentality.

11. A machine for operating upon the peripheral face of a heel comprising a plurality of operating tools, a movable carrier, means for moving said carrier to move the heel into co-operative relation with one after another of the tools, a heel support on the carrier, means for rotating said support relatively to the carrier, means external to said carrier for moving the same, means on the carrier for controlling the rotation of the heel support, and means external to the carrier for operating said controlling means, said controlling means being constructed and arranged to move the carrier to bring the relatively straight sides of the heels past the operating tools and to rotate said work supports at points opposite said tools to bring a curved part of the heel into operative engagement with each of the tools.

12. In a machine of the character described, a rotatable turret, a plurality of tools operatively mounted around the periphery of the said turret externally of the turret, a plurality of work supports rotatably mounted on the turret, a spider rotatable with respect to the turret constructed and arranged to rotate the work supports on the turret, and cam controlled means for operating said spider and rotating said turret.

13. In a machine of the character described, a freely pivoted rotatable turret, an operating tool movably mounted adjacent to said turret, a work support rotatably mounted upon the turret and positioned to bring the work into operative engagement with the tool, a spider geared to the work support, a rotatably mounted fulcrum member, a rotatable cam, means for moving said fulcrum member and said cam intermittently, and operating connections between the fulcrum member, the cam, the spider, and the turret constructed and arranged to effect movement of the turret while the work support is relatively stationary with respect to the turret and to effect rotation of the work support while the turret is relatively stationary with respect to the tool.

14. In a machine of the character described, a rotatable turret, work supports movably mounted on said turret, means for causing rotation of the turret, means for causing movement of the work supports with respect to the turret, clutches for controlling the operation of said two latter means, and a single cam for controlling both clutches.

15. In a machine of the character described, a movable carrier, work supports movably mounted on said carrier, means for moving the carrier and the work supports, and means for causing movement of the work supports with respect to the carrier, clutches for controlling the operation of said last two means, and a single cam for rendering first one clutch and then another effective.

In testimony whereof I have signed my name to this specification.

ALFRED B. FOWLER.